United States Patent [19]

Sugiura

[11] Patent Number: 5,311,334
[45] Date of Patent: May 10, 1994

[54] METHOD AND APPARATUS FOR COLOR CONVERSION OF AN ORIGINAL IMAGE

[75] Inventor: Takashi Sugiura, Tokyo, Japan

[73] Assignee: Canon Kabushiki Kaisha, Tokyo, Japan

[21] Appl. No.: 381,847

[22] Filed: Jul. 19, 1989

[30] Foreign Application Priority Data

Jul. 20, 1988 [JP] Japan .................................. 63-182556

[51] Int. Cl.$^5$ ............................................. H04N 1/46
[52] U.S. Cl. .................................. 358/537; 358/518; 358/538
[58] Field of Search ........................ 358/75, 78, 80, 27, 358/28, 453, 452, 518, 521, 531, 532, 537, 538; 382/22; H04N 1-46

[56] References Cited

U.S. PATENT DOCUMENTS

| | | | |
|---|---|---|---|
| 4,204,728 | 5/1980 | Goshima et al. ....................... | 358/75 |
| 4,644,391 | 2/1987 | Shibuya et al. ........................ | 358/75 |
| 4,707,713 | 11/1987 | Ayata et al. ........................... | 358/75 |
| 4,796,086 | 1/1989 | Ohta et al. ............................. | 358/75 |
| 4,855,765 | 8/1989 | Suzuki et al. .......................... | 358/80 |
| 4,873,570 | 10/1989 | Suzuki et al. .......................... | 358/80 |
| 4,937,662 | 6/1990 | Matsumawa et al. ................. | 358/75 |
| 4,979,129 | 12/1990 | Okubo et al. .......................... | 358/401 |
| 5,028,991 | 7/1991 | Sekizawa et al. ..................... | 358/80 |
| 5,136,401 | 8/1992 | Yamamoto et al. ................... | 358/474 |
| 5,138,443 | 8/1992 | Ikeda et al. ........................... | 358/518 |

FOREIGN PATENT DOCUMENTS 292212A 11/1988 European Pat. Off. .

Primary Examiner—Edward L. Coles, Sr.
Assistant Examiner—Kim Yen Vu
Attorney, Agent, or Firm—Fitzpatrick, Cella, Harper & Scinto

[57] ABSTRACT

An image processing apparatus comprises a device for designating a desired color; a device for discriminating a desired color in an objective color image; and a device for color converting portions other than the desired color in the objective color image which was discriminated by the discriminating device, wherein the color converting device color converts the portions other than the desired color which was discriminated by the discriminating device.

19 Claims, 8 Drawing Sheets

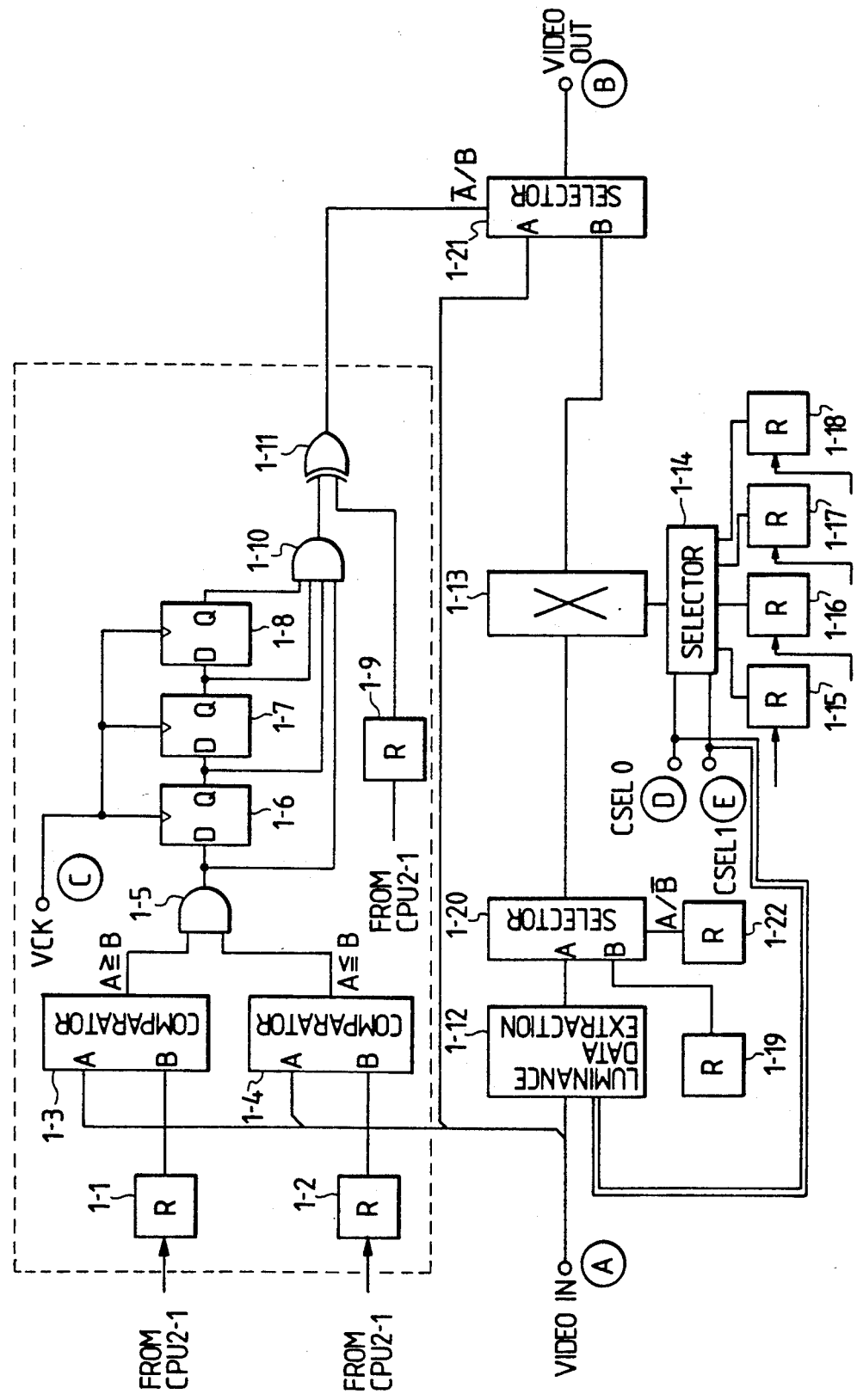

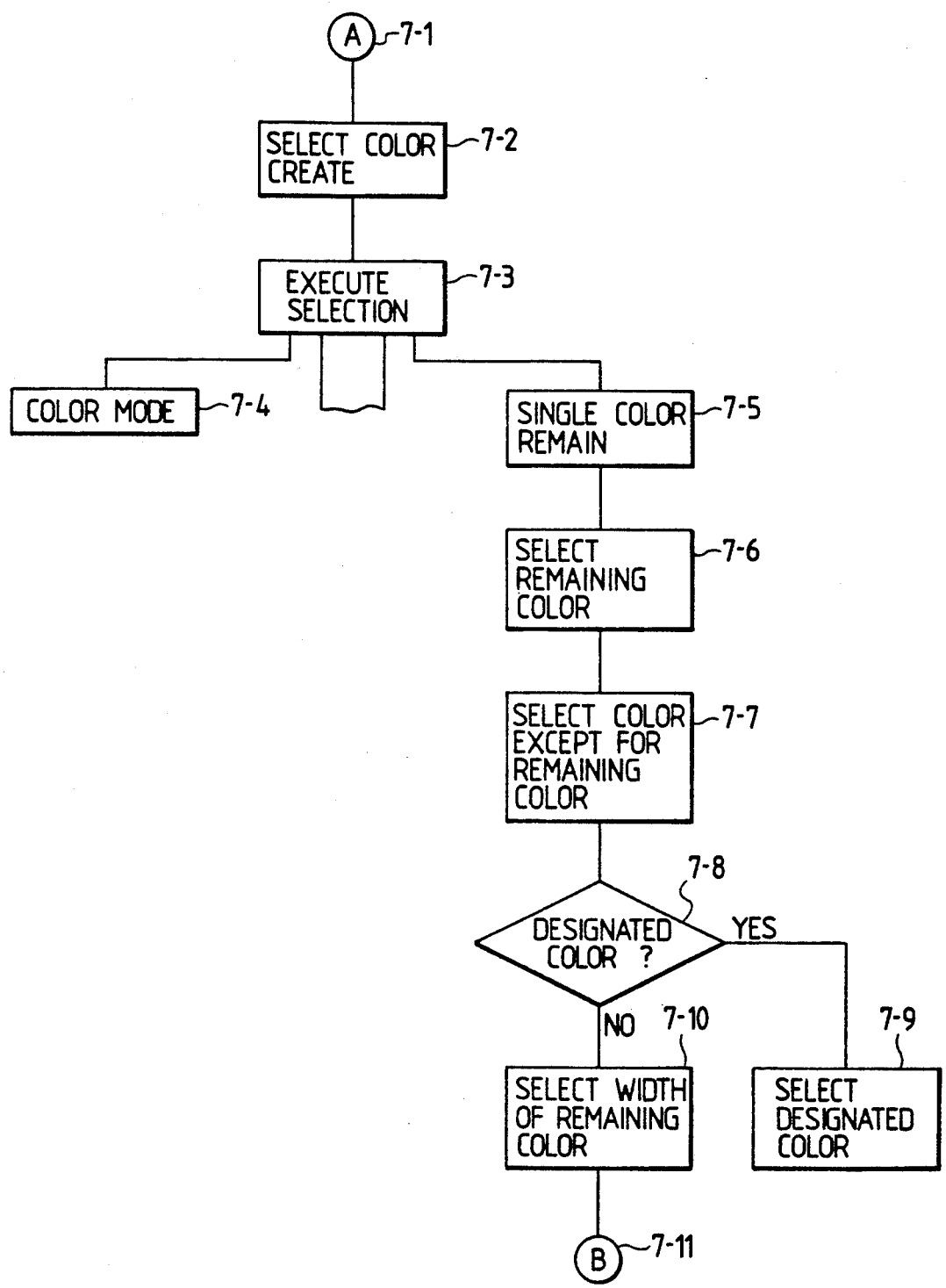

METHOD AND APPARATUS FOR COLOR CONVERSION OF AN ORIGINAL IMAGE

BACKGROUND OF THE INVENTION

1. Field of the Invention

The present invention relates to an apparatus for processing a given color image.

2. Related Background Art

Hitherto, an apparatus for performing the color conversion as an example of the image processes has been known. However, in such an apparatus, it is a general way to color convert the designated color.

As such an apparatus, for instance, there have been proposed apparatuses as disclosed in U.S. patent application Ser. Nos. 277515, 120820 and 230741 by the same assignee as the present invention.

However, in the above conventional apparatuses, in the case where a part of a color image is allowed to remain as an objective image and the other portions are color converted or masked, it is necessary to designate all of the portions other than the color to be allowed to remain in the color original. Particularly, if a plurality of colors exist in the portions other than the portion which is allowed to remain, it is difficult to designate all of such a plurality of colors. On the other hand, even if they could be designated, it is difficult to execute a converting process such that all of the designated colors are discriminated and are color converted.

SUMMARY OF THE INVENTION

It is an object of the present invention to provide a color image processing apparatus which can solve the above problems and can easily execute the color conversion.

Another object of the invention is to provide color image processing method and apparatus which can convert colors other than a desired color in an objective color image.

Under such objects, according to a preferred embodiment of the invention, there is disclosed an image processing apparatus comprising: means for designating a desired color; means for discriminating the desired color in an objective color image; and means for converting colors other than the desired color in the objective color image which was discriminated by the discriminating means, wherein the color converting means converts the colors other than the desired color which was discriminated by the discriminating means.

Still another object of the invention is to provide an image processing apparatus in which only a desired color is allowed to remain accurately and a predetermined process can be executed for the colors other than the desired color.

The above and other objects and features of the present invention will become apparent from the following detailed description and the appended claims with reference to the accompanying drawings.

BRIED DESCRIPTION OF THE DRAWINGS

FIG. 1 is a block diagram showing a construction to realize a single color remaining mode in an embodiment of the present invention;

FIGS. 6-1 to 6-4 are diagram showing a state of the screen of a touch panel in an operation unit to execute the operation in the single color remaining mode;

FIG. 7 is a flowchart showing the operation of a CPU 21;

DESCRIPTION OF THE PREFERRED EMBODIMENTS

Figure 5:
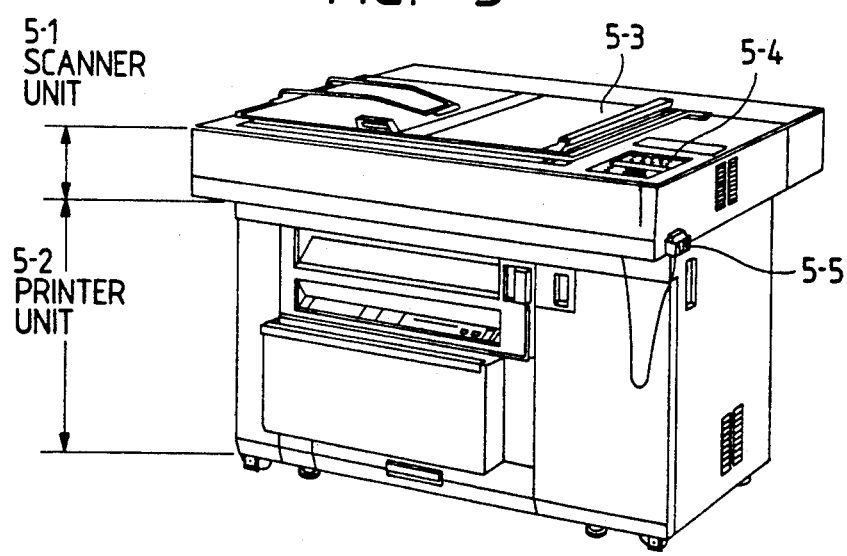
FIG. 5 is a perspective view showing an external view of an apparatus for embodying the invention.

FIG. 5 is a perspective view showing an external view of an apparatus in an embodiment of the present invention.

In FIG. 5, reference numeral 5-1 denotes a scanner unit for reading an original and executing various kinds of image processes and 5-2 indicates a printer unit to output the result. In the embodiment, an ink jet printer is used. However, the invention is not limited to it. Reference numeral 5-3 indicates an original base plate cover under which the original is placed; 5-4 indicates an operation panel to designate various kinds of copying modes as well as a single color remaining mode in the embodiment; and 5-5 a stick editor which is used to select a desired single color which is allowed to remain or a conversion color other than the remaining color, which will be described herein later.

Figure 4:
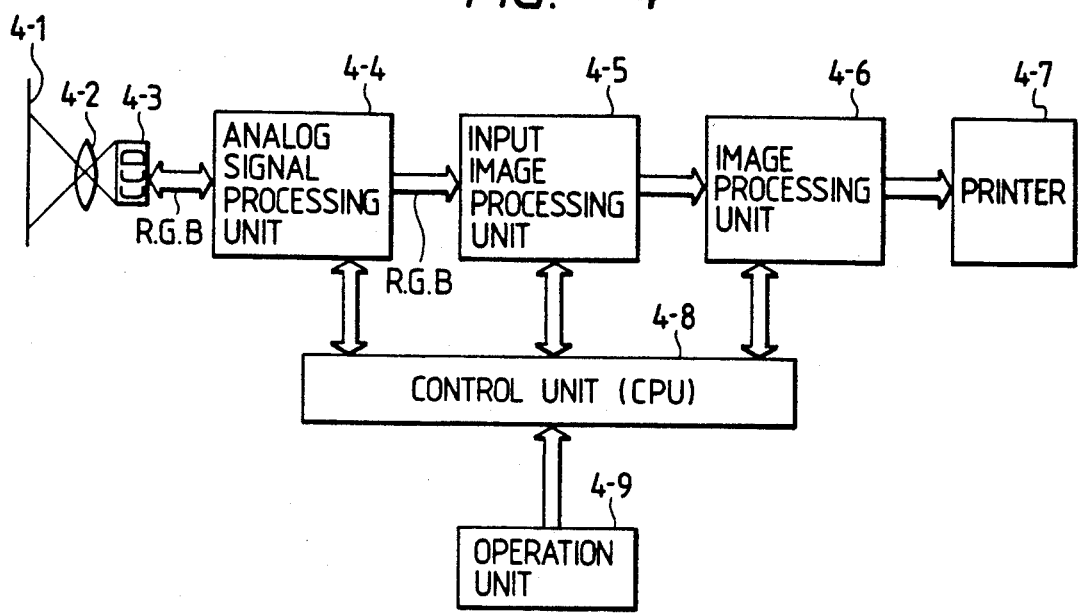
FIG. 4 is a block diagram showing the flow of an image signal in an apparatus for embodying the invention.

FIG. 4 is a diagram showing the flow of an image signal in the apparatus shown in FIG. 5.

In FIG. 4, reference numeral 4-1 denotes an original; 4-2 indicates an image forming lens; and 4-3 represents a CCD serving as a photoelectric conversion unit. In the embodiment, filters of R, G, and B are provided for the CCD 4-3. Mosaic filters may be also provided for the CCD 4-3. Other type of filters can be also provided for the CCD 4-3. The reflected light from the original 4-1 is image formed onto the CCD 4-3 by the image forming lens 4-2 and converted into an analog electric signal. The converted image information is dot-sequentially and serially processed in accordance with the sequence of, for instance, R (red)→G (green)→B (blue) and is sent to an analog signal processing unit 4-4. In the processing unit 4-4, the image signals are subjected to the sampling and holding process and the one-color separating process every color of red, green, and blue. Thereafter, the dark level is corrected, the dynamic range is controlled, and the like. Then, the processed analog image signals are converted into the digital image signals having serial multivalues (for instance, the image data of each color consists of eight bits). The digital image signals are transmitted to an input image processing unit 4-5. In the processing unit 4-5, the digital image signals of serial multivalues are similarly subjected as they are to the correcting processes such as shading correction, color correction, and the like which are necessary in the reading system. On the other hand, in this portion, the single color remaining operation of the characteristic portion in the embodiment is also realized. Next, in an image processing unit 4-6, the multivalue data is binarized and subjected to the half tone process by the dither method, error diffusion method, or the like. The processed data is then sent to a printer unit 4-7. On the other hand, all of the above processes are controlled by a control unit (CPU) 4-8 through an operation unit 4-9.

Figures 1, 6:
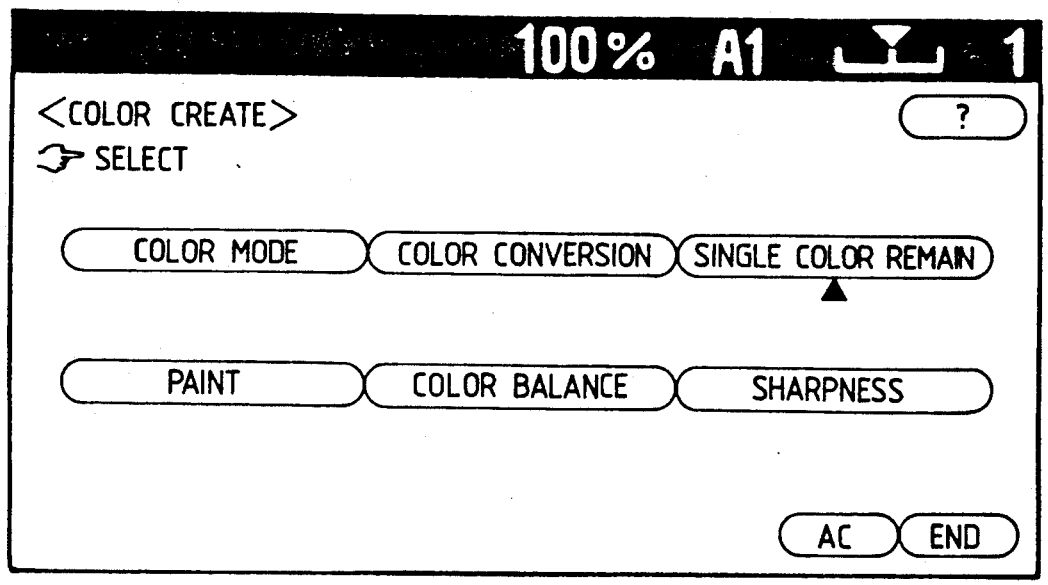
Figures 2, 6:
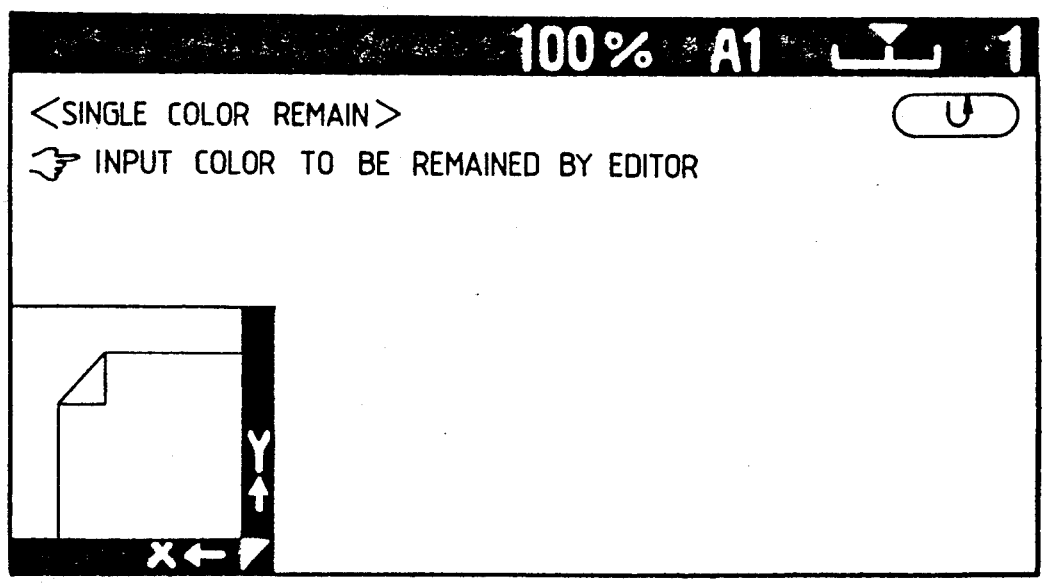
Figures 3, 6:
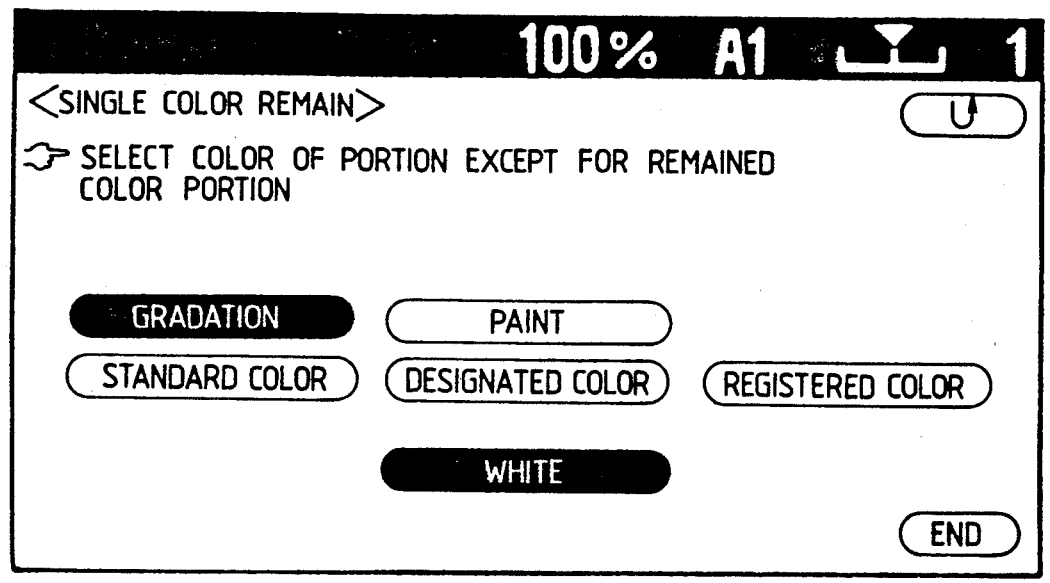
Figures 4, 6:
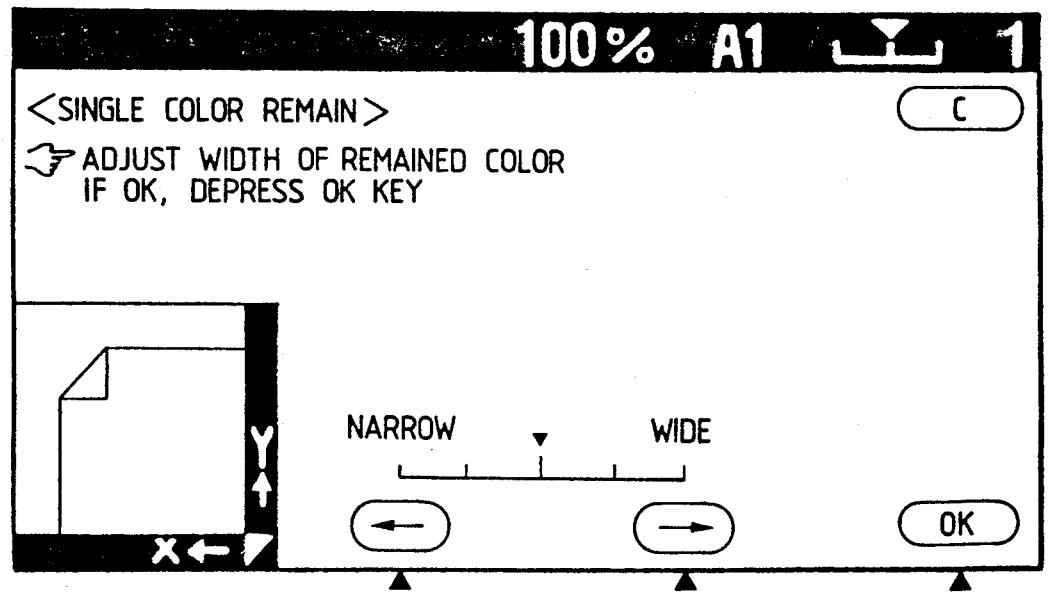

(Description of FIG. 1

Figure 3:
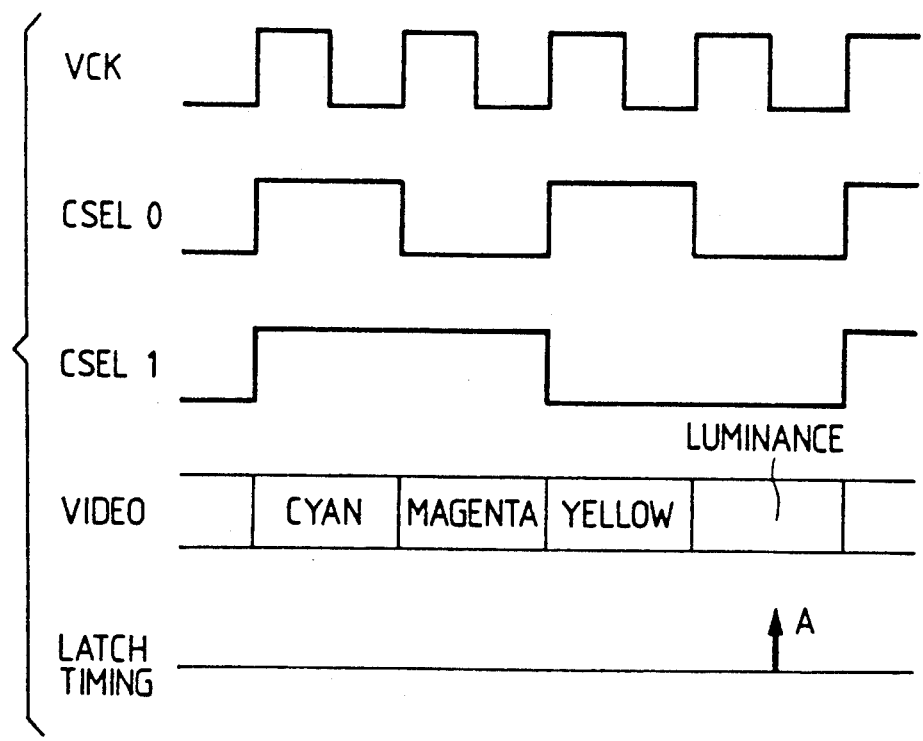
FIG. 3 is a timing chart for image data and various timing signals.

In the input image processing unit 4-5 and subsequent circuit units, as shown in FIG. 3, the image data time-sequentially flow in accordance with the sequence of the luminances of cyan, magenta, and yellow which were obtained from R, G, and B by the complementary color conversion and at a predetermined ratio of R, G, and B (for instance, the ratio shown by 0.3 R+0.6 G+0.1 B). The image data of one pixel is formed by four colors. That is, one period of a signal $CSEL_1$ corresponds to one pixel and the color of the image data is shown by signals $CSEL_0$ and $CSEL_1$. The signals $CSEL_0$ and $CSEL_1$ are output from analog signal processing unit 4-4. VCK is an abbreviation of VIDEO CLOCK. The image data flows in the image processing system at the period based on the VCK.

Figure 2:
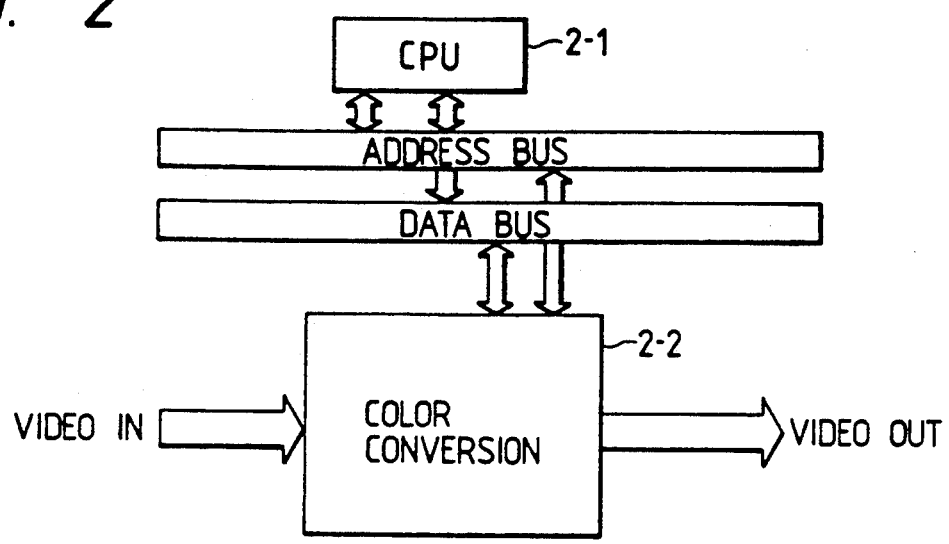
FIG. 2 is a hardware constructional diagram around a color conversion unit.

On the other hand, FIG. 2 is a diagram showing a schematic construction of the main section in the input image processing unit 4 5. Reference numeral 2-1 denotes a CPU and 2-2 indicates a color conversion unit. The image data is subjected to the single color remaining image process by the color conversion unit 2-2.

The simple operation of FIG. 1 will now be described. In FIG. 1, the image data is input from a VIDEO IN terminal (A). A color range which is allowed to remain is compared by comparators 1-3 and 1-4. Reference numerals 1-1 and 1-2 denote registers. The lower limit of the color which is allowed to remain is set to the register 1-1 by the CPU. The upper limit of the color which is allowed to remain is set to the register 1-2 by the CPU. At this time, since the image data time-sequentially flow in accordance with the sequence of the luminances of cyan, magenta, and yellow, it is necessary to set the data of four colors to each of the registers 1-1 and 1-2.

The result of the comparison of the comparators 1-3 and 1-4 is input to an AND circuit 1-5 and a check is made to see if the color data which was input from the input terminal (A) corresponds to the color to be allowed to remain in the color range which is allowed to remain or not. That is, if the output level of the AND circuit 1-5 is set to 1, this means that the color which remains exists in such a color range, and if it is set to 0, the color which is allowed to remain is out of the color range. As shown above, since the image data time-sequentially flow, the results of the discriminations of the respective colors are latched by flip-flops (hereinafter, referred to as D-FF) 1-6, 1-7, and 1-8. The final discrimination result including all colors is output from an AND circuit 1-10. That is, if the output level of the AND circuit 1-10 is set to 1, the color to be allowed to remain exists in the color range which is allowed to remain. If it is set to 0, the color to be allowed to remain is out of the color range. On the other hand, by setting "0" to a register 1-9, an EX OR circuit 1 11 outputs a "1" level signal when the input image data lies within a predetermined color range. On the other hand, by setting "1" to the register 1-9, the signal which is set to the "0" level when the color which is allowed to remain falls within the color range can be fetched. The image before conversion is supplied to an A input terminal of a selector 1-21. The image after the conversion is supplied to a B input terminal of the selector 1-21. When a selection signal is set to "0", the A input is selected, that is, the original image data is output. When the selection signal is set to "1", the B input is selected. Therefore, by setting "0" to the register 1-9, the signal in the color range can be color converted. By setting "1" to the register 1-9, the signal out of the color range can be color converted. In this manner, the switching operation can be realized by the selector 1-21. That is, "1" is set to the register 1-9 in the single color remaining mode in the embodiment.

In the embodiment, addresses are assigned to the above registers so as to rewrite the data in the registers in accordance with commands from the CPU 2-1.

The portion to form the color after the conversion will now be described. The luminance data in the image data which was input from (A) is extracted from a luminance data extraction circuit 1-12. The extracting method can be easily realized in a manner such that the signals $CSEL_0$ and $CSEL_1$ are decoded, a latch signal of a luminance signal is formed at the timing shown by A in FIG. 3, and the luminance data is latched in response to the latch signal. The extracted luminance signal is transmitted through a selector 1-20 and is input to a multiplying circuit 1-13. On the other hand, reference numerals 1-15 to 1-18 denote registers to set multiplication values for the luminance data and four registers are provided for the respective colors of cyan, magenta, yellow, and luminance. The register corresponding to each color is selected from among the set registers by a selector 1-14 and the multiplication value of the selected register is multiplied to the luminance data. (D) and (E) denote selection signals. At this time, "1" is set to the multiplying register corresponding to the luminance. Therefore, the multiplying circuit 1-13 outputs the data set in the registers 1-15 to 1-18, that is, the image data at the ratio among cyan, magenta, and yellow corresponding to the designated colors and in which the amounts of color components are proportional to the luminance data. Such image data becomes the image in which the ratio among cyan, magenta, and yellow is constant and only the luminance changes The image which was subjected to the above processes is hereinafter referred to as a color converted image with light and dark concentrations for simplicity of explanation. In the above mode, "1" is set to a register 1-22 and the selector 1-20 selects the A input. That is, the counting operation is executed in a manner such that the luminance data is output to the multiplying circuit 1-13.

On the other hand, the CPU can directly set the image data into the register 1-19. By setting "1" to the register 1-22, the selector 1-20 selects the A input, that is, the luminance data is allowed to flow and the color converted image with light and dark concentrations is output. On the contrary, by setting "0" to the register 1-22, the fixed data set to the register 1-19 is output from the selector 1-20 and is input to the multiplying circuit 1-13. The color conversion by the fixed data is hereinafter referred to as a painting function. On the other hand, in the case of selecting the mode (single color remaining masking mode) in which no color is painted to the portions other than the single color remaining portion, it is sufficient that the fixed data, namely, "0" is set to the register 1-19 and a fixed value, that is, the side of the register 1-19 is selected by the selector 1-20.

Description of the operating method

The operation panel 5-4 in the apparatus shown in FIG. 5 will now be described in detail.

FIG. 6 is a diagram showing the display screen of a liquid crystal touch panel in the operation panel 5-4 shown in FIG. 5. Such a display example will be described with reference to a flowchart of FIG. 7. The processing routine in the flow is started from 7-1. A color creating process is selected in step 7-2. Then, as shown in FIG. 6-1, the screen to select each process in the color creating routine is displayed. In the following description, the single color remaining mode is selected (steps 7-3 and 7-5). When the single color remaining mode is selected, the screen is displayed as shown in FIG. 6-2 a color to be allowed to remain is selected by the editor (step 7-6). In the embodiment, such a color is selected by a method whereby a point mark is moved along the original surface by the stick editor while observing the original surface and the image to be selected is pointed out, so that the desired image is selected. That is, in the embodiment, the CCD 4-3 does not correspond to the size of the whole surface of the original but the selecting operation is executed by moving the CCD 4-3 to the portion designated by the stick editor. After completion of the selection, the screen is displayed as shown in FIG. 6-3 and the color of the portion other than the remaining color is selected (step 7-7). Either one of the gradation converting mode and the painting mode is first selected and the color is then selected. A standard color shown in FIG. 6-3 denotes a single color of cyan, magenta, or yellow or a single color of red, green, or blue, while a registered color indicates the color which has previously been registered by the user by using the stick editor 5-5. In this case, if white is selected as a color other than the remaining color, the portions other than the portion of the remaining color are not printed (that is, they are masked). On the other hand, if the designated color is selected (step 7-8), a designated color selecting process (step 7-9) is executed by the stick editor 5-5. After completion of the above operation, the screen is displayed as shown in FIG. 6-4. A width of portion corresponding to the remaining color is selected (step 7-10). By setting the width to a wide value, the designated color can be certainly made to remain. However, if the width is set to be too wide, the portion other than the designated portion will also remain so that there is a possibility of the occurrence of malfunction. On the contrary, if a narrow width is set, only the designated portion can be made to remain. However, if the width is set to be too narrow, only the sampled points remain and there is a possibility such that the whole portion which the user wants to leave does not remain. By setting the width by pressing the "←" or "→" key shown in FIG. 6-4 the CPU 2-1 sets the upper and lower limits of the remaining color range into the registers 1-1 and 1-2 on the basis of the result of the selection of the remaining color. On the other hand, if the result of the selection of the color other than the remaining color indicates the gradation mode, "1" is set to the register 1-22. If the result of the selection of the color other that the remaining color represents the painting mode "0" is set to the register 1-22, and the concentration value of the image data which is used to paint is set to the register 1-19. On the other hand, when colors other than the remaining color are selected, the multiplication values corresponding to the colors other than the remaining color are set to the registers 1-15 to 1-18. When the single color remaining mode is selected, "1" is set to the register 1-9. If the other color creating mode is selected, "0" is set to the register 1-9. If the portions other than the remaining color are set to white (masked). "0" is set to the registers 1-19 and 1-22 and the fixed concentration of "0" is selected by the selection 1-20.

Another embodiment

Figure 8:
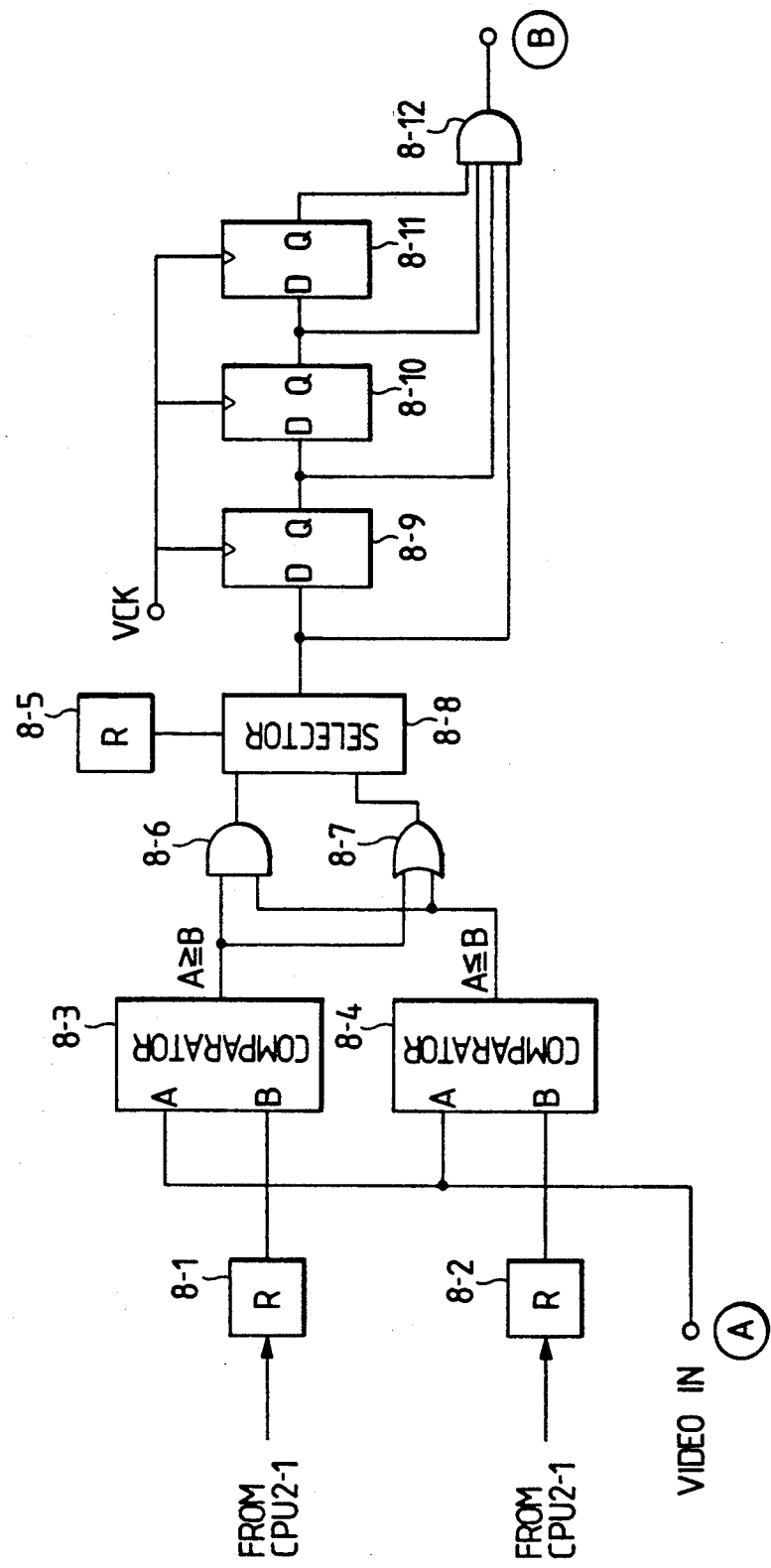
FIG. 8 is a block diagram of first another embodiment of the block shown in FIG. 1.

Another embodiment will now be described with reference to FIG. 8. FIG. 8 shows the case where the portion surrounded by a broken line in FIG. 1 is replaced with another construction. In FIG. 8, in a manner similar to FIG. 1, the image data is input to the VIDEO IN terminal (A) and a color conversion signal is output from a terminal (B) on the basis of the logic such that the conversion is executed when the color conversion signal is set to "1" and the conversion is not executed when it is set to "0".

The upper and lower limits of the color range of the color converting portion are set to registers 8-1 and 8-2 by the CPU. The results of the comparison are output from comparators 8-3 and 8-4. Assuming that the image data is set to D, the upper limit is set to $D_{max}$ and the lower limit is set to $D_{min}$, an area signal of $D_{min} \leq D \leq D_{max}$ is output from an AND circuit 8-6, while an area signal of $D_{min} \leq D$ or $D_{max} \leq D$ is output from an OR circuit 8-7. Data indicating which one of those area signals is selected is set to a register 8-5 and either one of them is selected by a selector 8-8. Discrimination signals of the respective colors are latched to flip-flops (D-FF) 8-9 to 8-11. A color conversion signal is ouput from an AND circuit 8-12. The AND circuit 8-6 is selected in the case of executing the ordinary color conversion. The single color remaining mode can be realized by selecting the OR circuit 8-7. On the other hand, actually, when the single color remaining mode is selected, it can be easily realized by using an OR circuit in place of the AND circuit 8-12. In this case, it is desirable to construct in a manner such that either one of the OR circuit and AND circuit can be selected and the OR circuit is selected only in the single color remaining mode.

Another embodiment - 2

Figure 9:
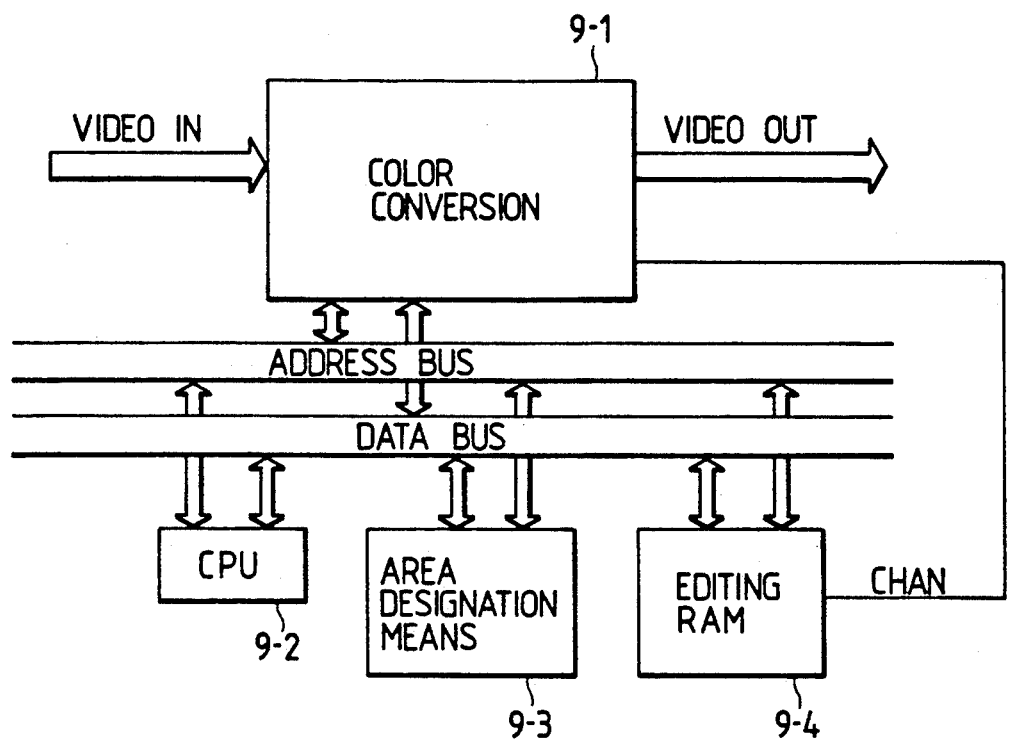
FIG. 9 is a block diagram showing another construction of FIG. 2.

The single color remaining mode can be realized by directly designating the remaining color as described in the above embodiment or can be also realized by designating the remaining area. As the means for designating the area, the stick editor 5-5 shown in the above embodiment or the like can be used, or the area can be also designated by tracing the area by a digitizer. FIG. 9 shows a simple block. Reference numeral 9-1 denotes a portion which is actually color converted; 9-2 shows a CPU; 9-3 indicates area designating means such as a digitizer or the like; 9-4 represents an editing RAM. For instance, the RAM 9-4 comprises a bit map memory having a depth of one bit and a capacity of one page of the original. The CPU writes "0" into the designated area. When a single color remaining area is designated by the digitizer 90-3 or the like, "0" is written into the area and "0" is written into the portions other than the designated area by the CPU in accordance with the area designating algorithm. After the area was designated, the content of the editing RAM is sent to the color conversion unit 9-1 synchronously with the image data. By handling the transmitted signal as the foregoing color conversion signal, for instance, the input signal of the selector 1-21 in FIG. 1, the single color remaining process can be realized. However, in this case, it is necessary to accurately designate the area and such a method is not fitted as a method of allowing one color to remain in the portion of a complicated shape. In the case of allowing one color to remain in a delicate color portion, there is also a case where such a portion does not clearly remain if the color discrimination signal is used as in the above two embodiments but in place of such a method, by designating the area and allowing one color to remain in the designated area, the clear output result is derived.

Figure 10:
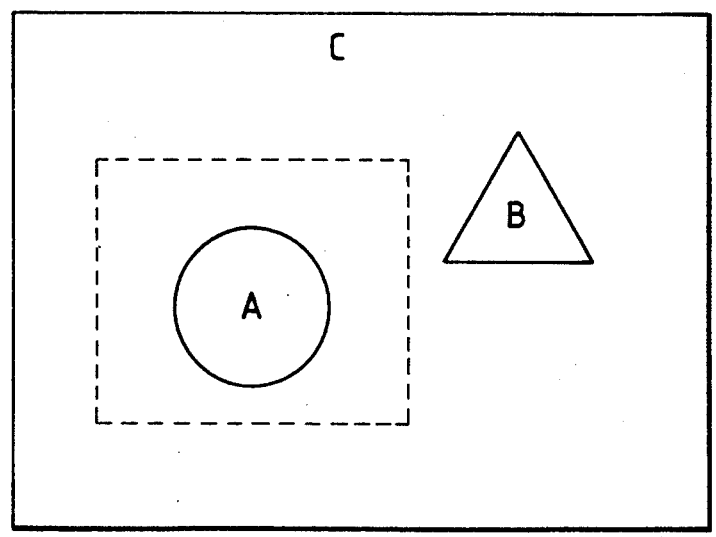
FIG. 10 is a diagram for explaining the operation of the block shown in FIG. 9.

An example of a combination of the first or second embodiment and the third embodiment is also considered. For instance, in the case of combining the first and third embodiments, the single color remaining process can be more accurately realized by obtaining an OR output of the single color remaining color range signal ("1" is set to the register 1-9) and a CHAN signal of the editing RAM 9-4 in FIG. 9 by the EX-OR circuit 1-11 in FIG. 1. In such a case, the remaining area is roughly designated (for instance, a rectangular area may be set). The example in this case will now be described with reference to FIG. 10. In the case where the colors of areas A and B in the original surface are close and the area A is sampled to allow only the area A to remain upon execution of the single color remaining mode, the area B is erroneously discriminated and remain according to the first and second embodiments. Therefore, the area surrounded by a broken line in FIG. 10 is selected and input to the editing RAM in accordance with the third embodiment and an OR signal of the single color remaining color range signal and the CHAN signal is used as a conversion signal as described above, so that the erroneous discrimination of the area B can be prevented.

Therefore, according to such an embodiment, the accuracy in the single color remaining mode can be further improved.

According to the embodiment as described above, in the case where only the portion of one color in the color original remains as it is and the other portions are subjected to the color converting process with light and dark concentrations, painting process, or masking process, by selecting the single color remaining mode in the invention, it is sufficient to set a sampling point to one portion of the remaining color, the operability is good, and the output result can be also accurately and clearly reproduced as compared with that in the conventional single color remaining method in which the color conversions are combined.

In the above-described embodiments, the single color remaining mode processes have been executed for the image signal obtained by converting the image on the color original into the electric signal by the photoelectric converting unit such as a CCD or the like. However, the photoelectric converting unit is not necessarily used in the invention. For instance, data which is not transmitted through the photoelectric converting unit such as data from a computer graphics apparatus can be also used as input image data.

I claim:

1. A full color image processing apparatus comprising:
    designating means for designating a target color;
    discriminating means for discriminating said target color in an original color image; and
    converting means for converting a color in the original color image, other than said target color, which was discriminated by said discriminating means, into a desired color without color converting said target color, said desired color being different from said target color, wherein said desired color is colorless whereby the color other than the target color in the original color image is converted into a blank image.

2. An apparatus according to claim 1, wherein said discriminating means discriminates the target color by comparing each of a plurality of color component signals with a predetermined value.

3. A full color image processing apparatus comprising:
    designating means for designating a target color;
    discriminating means for discriminating said target color in an original color image;
    converting means for converting a color in the original color image, other than said target color, which was discriminated by said discriminating means, into a desired color without color converting said target color, said desired color being different from said target color; and
    third designating means for designating a color range which is discriminated with said target color by said discriminating means.

4. An apparatus according to claim 3, wherein said third designating means widely or narrowly designates said color range.

5. An apparatus according to claim 3, wherein said discriminating means discriminates the target color by comparing each of a plurality of color component signals with a predetermined value.

6. A full color image processing method comprising the steps of:
    designating a target color;
    discriminating the target color in an original color image;
    converting a color in the original color image, other than the target color, which was discriminated in said 7. A method according to claim 6, wherein the color range can be widely or narrowly designated in said designating step.

8. A method according to claim 6, wherein in said discriminating step the target color is discriminated by comparing each of a plurality of color component signals with a predetermined value.

9. A full color image processing method comprising the steps of:
    reading an original color image;
    converting the original color image into a plurality of color component signals;
    designating an area in the original color image;
    designated a target color;
    discriminating the plurality of color component signals converted in said converting step, the designated target color being discriminated in the designated area;
    converting the color of areas in the original color image having colors other than the target color, which was discriminated in said discriminating step, into a desired color without color conversion of the target color, the desired color being different from the target color; and
    designating a color range to be discriminated with said target color in said discriminating step.

10. A full color image processing apparatus comprising:

image converting means for reading an original color image and converting said original color image into a plurality of color component signals;

first designating means for designating an area in said original color image;

second designating means for designating a target color;

discriminating means for discriminating said plurality of color component signals converted by said converting means, said discriminating means discriminating the target color designated by said second designating means in said area designated by said first designating means; and color converting means for converting the color of areas in said original color image having colors other than said target color, which was discriminated by said discriminating means, into a desired color, without color conversion of said target color, said desired color being different from said target color.

11. An apparatus according to claim 10, wherein said second designating means designates said target color by designating a color in said original color image.

12. An apparatus according to claim 10, wherein said desired color is colorless whereby the color other than the target color in the original color image is converted into a blank image.

13. An apparatus according to claim 10, further comprising:

third designating means for manually designating said desired color.

14. An apparatus according to claim 10, further comprising:

fourth designating means for designating a color range which is discriminated with said target color by said discriminating means.

15. An apparatus according to claim 10, further comprising:

reproducing means for reproducing the image converted by said color converting means as a visible image.

16. A full color image processing method comprising the steps of:

designating a target color;

discriminating the target color in an original color image; and converting a color in the original color image, other than the target color, which was discriminated in said discriminating step, into a desired color, without color converting the target color, the desired color being different from the target color, wherein the desired color is colorless and in said converting step the color other than the target color in the original color image is converted into a blank image.

17. A method according to claim 16, wherein in said discriminating step the target is discriminated by comparing each of a plurality of color component signals with a predetermined value.

18. A full color image processing method comprising the steps of:

reading an original color image;

converting the original color image into a plurality of color component signals;

designating an area in the original color image;

designated a target color;

discriminating the plurality of color component signals converted in said converting step, the designated target color being discriminated in the designated area; and converting the color of areas in the original color image having colors other than the target color, which was discriminated in said discriminating step, into a desired color without color conversion of the target color, the desired color being different from the target color, wherein the desired color is colorless and in said converting step the color other than the target color in the original color image is converted into a blank image.

19. A method according to claim 18, wherein in said discriminating means the target color is discriminated by comparing each of the plurality of color component signals with a predetermined value.

* * * * *

UNITED STATES PATENT AND TRADEMARK OFFICE
CERTIFICATE OF CORRECTION

PATENT NO. : 5,311,334
DATED : May 10, 1994
INVENTOR(S) : Takashi SUGIURA

It is certified that error appears in the above-indentified patent and that said Letters Patent is hereby corrected as shown below:

COLUMN 1:

Line 60, "BRIED" should read --BRIEF--.

COLUMN 2:

Line 6, "diagram" should read --diagrams--.

COLUMN 3:

Line 25, "4 5." should read --4-5.--; and
   Line 61, "circuit 1 11" should read --circuit 1-11--.

COLUMN 4:

Line 44, "changes" should read --changes.--.

COLUMN 5:

Line 16, "FIG. 6-2" should read --FIG. 6-2 and--;
   Line 55, "FIG. 6-4" should read --FIG. 6-4,--; and
   Line 61, "that" should read --than--.

UNITED STATES PATENT AND TRADEMARK OFFICE
CERTIFICATE OF CORRECTION

PATENT NO. : 5,311,334
DATED : May 10, 1994
INVENTOR(S) : Takashi SUGIURA

It is certified that error appears in the above-indentified patent and that said Letters Patent is hereby corrected as shown below:

COLUMN 6:

Line 4, "(masked)." should read --(masked),--;
    Line 26, "$D_{min} \leq D$" should read --$D_{min} \geq D$--;
    Line 60, "digitizer 90-3" should read --digitizer 9-3--; and
    Line 61, " "0" " should read --"1"--.

COLUMN 8:

Line 40, "said" should read --said discriminating step, into a desired color, without color converting the target color, the desired color being different from the target color; and
    designating a color range to be discriminated with said target color in said discriminating step.--; and
    Line 54, "designated" should read --designating--.

COLUMN 10:

Line 16, "target" should read --target color--; and

UNITED STATES PATENT AND TRADEMARK OFFICE
CERTIFICATE OF CORRECTION

PATENT NO. : 5,311,334
DATED : May 10, 1994
INVENTOR(S) : Takashi Sugiura

It is certified that error appears in the above-indentified patent and that said Letters Patent is hereby corrected as shown below:

Column 10, line 25, "designated" should read --designating--.

Signed and Sealed this

Seventh Day of March, 1995

Attest:

BRUCE LEHMAN

Attesting Officer     Commissioner of Patents and Trademarks